United States Patent
Hunter et al.

(10) Patent No.: US 7,072,509 B2
(45) Date of Patent: Jul. 4, 2006

(54) ELECTRONIC IMAGE COLOR PLANE RECONSTRUCTION

(75) Inventors: Andrew Arthur Hunter, Bristol (GB); Stephen Bernard Pollard, Dursley (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 650 days.

(21) Appl. No.: 10/134,491

(22) Filed: Apr. 30, 2002

(65) Prior Publication Data

US 2003/0021474 A1  Jan. 30, 2003

(30) Foreign Application Priority Data

Jul. 27, 2001  (GB) ................................ 0118456.3

(51) Int. Cl.
*G06K 9/00* (2006.01)

(52) U.S. Cl. ........................................ 382/167; 382/164

(58) Field of Classification Search ................ 382/162, 382/167, 274, 275, 254, 260, 264, 299–300; 348/272–280, 222.1, 557, 712, 713; 358/512, 358/518, 520; 345/606–611
See application file for complete search history.

(56) References Cited

U.S. PATENT DOCUMENTS

| | | | | |
|---|---|---|---|---|
| 5,189,511 A | | 2/1993 | Parulski et al. | 358/518 |
| 5,887,077 A | * | 3/1999 | Bongardt et al. | 382/149 |
| 5,965,875 A | | 10/1999 | Merrill | 250/226 |
| 6,642,932 B1 | * | 11/2003 | Kok et al. | 345/606 |
| 6,724,945 B1 | * | 4/2004 | Yen et al. | 382/274 |
| 6,833,868 B1 | * | 12/2004 | Meynants et al. | 348/272 |
| 6,836,289 B1 | * | 12/2004 | Koshiba et al. | 348/273 |

FOREIGN PATENT DOCUMENTS

| | | | |
|---|---|---|---|
| GB | 2378077 | | 1/2003 |
| JP | 10-187949 | * | 7/1998 |
| JP | 2003-110860 | | 4/2003 |

OTHER PUBLICATIONS

Kharitonenko et al., "Suppression of Noice Amplification During Colour Correction", IEEE Transactions on Consumer Electronics, vol. 48, No. 2, May 2002 (published), pp. 229-233.

C. Tomasi and R. Manduchi, "Bilateral Filtering for Gray and Color Images," *Proceedings of the 1998 UEEE International Conference on Computer Vision*, Bombaym, India.

GB search report for GB0428147.3 dated Mar. 31, 2005.

* cited by examiner

*Primary Examiner*—Joseph Mancuso
*Assistant Examiner*—Ishrat Sherali (57) ABSTRACT

The color of a color image having at least two sets of image pixels having color and luminance values is corrected by generating, for each color value, a low spatial frequency monochrome image including a set of smoothed image pixels. A color correction function is applied to selected sub-sets of the image pixels to generate corresponding sub-sets of corrected, smoothed image pixels. The correction includes a contribution from smoothed image pixels in one or more of the other sets of smoothed image pixels. The sub-sets of corrected smoothed image pixels is completed by interpolation or extrapolation. Each set of corrected smoothed image pixels is used to generate a corrected color image by generating one or more high spatial frequency luminance images that are combined with each of the corrected low spatial frequency monochrome images to form a full color image.

25 Claims, 5 Drawing Sheets

Fig. 1

Fig. 2    Black and White

Fig. 3    RGB Mosaic

Red    Green    Blue

ELECTRONIC IMAGE COLOR PLANE RECONSTRUCTION

This invention relates to an image processing method and an image processing device for correcting the colour of an electronic colour image.

It is common to produce consumer colour sensors by introducing an alternating pattern of colour filters onto the array of individual sensor elements. This is often referred to as a colour mosaic and a commonly used variant is the RGB Bayer pattern, which has alternating rows of green/red and blue/green pixels (thus having twice as many green pixels as red and blue) on a regular grid. The goal of colour plane reconstruction (also called de-mosaicing) is to generate a full RGB image from an image captured with such a sensor.

No single colour plane has the full image resolution. In terms of total pixel count, with the Bayer pattern, green has half the resolution and red and blue each have one quarter.

It is very difficult to construct colour filters for sensors which exactly match the spectral characteristics of our eyes or which exactly match the primary colours used in computers to represent or display images. For this reason it is necessary for the captured images to be processed to map the sensed colours to the desired colour system.

To correct the colours in a captured image so that they more closely match the colours that we would have perceived in the same scene, each sensed colour can be mixed with appropriate percentages of the other two sensed colours. For example, an improved red signal at a point in an image may be derived from a weighted combination of the red (R), green (G) and blue (B) signals at that point.

$$C_r(R) = aR + bG + cB,$$

where $C_r(m)$ gives the corrected value for a red pixel of value m.

To correct all of the colours at the point of the image, a 3×3 matrix multiplication can be used.

$$C([R\ G\ B]) = [R\ G\ B] \begin{bmatrix} a & d & g \\ b & e & h \\ c & f & i \end{bmatrix},$$

where C(n) gives the corrected values for the RGB triplet n.

The matrix values a, b, . . . i, depend upon the characteristics of the sensor, the camera optics and the illumination of the scene, as well as on the human or computer colour system being matched. The derivation of these values is outside the scope of this invention.

Since the colour correction process requires all three colour values at each pixel location, it is normally applied after demosaicing the sensor data. The correction requires considerable computation for each colour value: nine multiplications and six additions per pixel in each image.

It is often the case that one colour channel will have more noise than the other colour channels. For example, the colour sensor arrays commonly used in still or video electronic cameras have red, green and blue filters to generate the colour image. The blue channel in the image is often darker that the other channels, owing to the way in which the blue filters are manufactured. As a result of this, the blue channel has worse signal-to-noise characteristics. Colour correction mixes the different colour planes, and so mixes the noisy blue information into the red and green channels. This situation is much worse for low saturation filters with broad spectral properties, as the colour correction calculations involve matrices with large off-axis components which have the effect of amplifying the noise.

It is an object of the invention to provide an efficient method for performing the colour correction step, for example when reconstructing an image from a filter mosaic.

According to a first aspect of the invention, there is provided image processing method for correcting the colour of a colour image, the colour image being composed of at least two sets of image pixels, each set having a distinct colour value, and each pixel having a luminance value representing the intensity of the colour value for that pixel in the colour image, the method comprising the steps of:

i) for each colour value, generating from the pixels for that colour value a low spatial frequency monochrome image composed of a set of smoothed image pixels;

ii) for at least one colour value, selecting a sub-set of the smoothed image pixels;

iii) applying a colour correction function to the or each sub-set of smoothed image pixels in order to generate one or more corresponding sub-sets of corrected smoothed image pixels, said function including for each colour value a contribution from corresponding smoothed image pixels in one or more of the other sets of smoothed image pixels;

iv) completing one or more sets of corrected smoothed image pixels by interpolating and/or extrapolating from the or each of the corrected smoothed image pixels to generate similarly corrected smoothed image pixels not in the original sub-set of smoothed image pixels; and v) using the or each set of corrected smoothed image pixels to generate a corrected colour image.

Also according to a first aspect of the invention, there is provided an image processing device for correcting the colour of a colour image, the device comprising a processor, software, and a memory, in which the memory stores image data representative of a colour image having at least two sets of image pixels, each set having a distinct colour value, and each pixel having a luminance value representing the intensity of the colour value for that pixel in the colour image, wherein the processor, software and memory are operable to:

a) for each colour value, generate from the pixels for that colour value a low spatial frequency monochrome image composed of a set of smoothed image pixels;

b) for at least one colour value, select a sub-set of the smoothed image pixels;

c) apply a colour correction function to the or each sub-set of smoothed image pixels in order to generate one or more corresponding sub-sets of corrected smoothed image pixels, said function including for each colour value a contribution from corresponding smoothed image pixels in one or more of the other sets of smoothed image pixels;

d) complete one or more sets of corrected smoothed image pixels by interpolating and/or extrapolating from the or each of the corrected smoothed image pixels to generate similarly corrected smoothed image pixels not in the original sub-set of smoothed image pixels; and e) use the or each set of corrected smoothed image pixels to generate a corrected colour image.

The invention is useful in various image processing systems. For example, it is possible to use the invention to help de-mosaic a colour image formed as an image mosaic from sets of interleaved pixels, each pixel set having a different colour value. Such mosaic pixels are usually interleaved in rows and columns across the image mosaic with pixels of different colour values to form the image mosaic in such a way that at least some rows and/or columns contain image pixels of at least two colours. In the Bayer pattern, each row and column contains image pixels of two colours.

In particular, the colour content of a colour image can be processed to remove high frequency content prior to being recombined with achromatic high frequency content. Therefore, the method may in step v) comprise the steps of generating from the original image pixels a high spatial frequency luminance image; and combining the high spatial frequency luminance images with said set(s) of corrected or uncorrected smoothed image pixels to form the corrected full colour image.

When using the achromatic high spatial frequency image to add back in image details, starting from an image mosaic, the high spatial frequency luminance image is preferably generated for each colour value only across pixels locations of the image mosaic for that colour value. Each of these high spatial frequency luminance images is then combined with each of the corresponding set(s) of corrected smoothed image pixels, or when there is no such corrected set, the corresponding set(s) of smoothed image pixels.

The intermediate smoothed image pixels may be similarly aligned along rows and columns. Since the rate of change of colour content across the low frequency image is reduced, the colour correction need not be computed in full at all pixel locations. This results in a significant savings in the required processing power and time, and associated hardware cost. As a result, the invention is useful whenever an intermediate low spatial frequency image is generated as part of an image processing scheme.

According to a second aspect of the invention, there is provided an image processing method for correcting the colour of a colour image, the image being composed of a plurality of image pixels and each image pixel having one of at least two colour values and having a luminance value representing the intensity of the colour value for that pixel in the image, the method comprising the steps of:

I) for each colour value, generating from the pixels for that colour value a low spatial frequency monochrome image composed of smoothed image pixels;

II) applying a colour correction function to the smoothed image pixels for one or more of colour values in order to generate one or more corresponding corrected smoothed images, said function including for the or each colour value a contribution from corresponding smoothed image pixels having one or more of the other colour values;

III) generating one or more high spatial frequency luminance images from the image; and IV) combining the high spatial frequency luminance image(s) with the or each of the corrected low spatial frequency monochrome images to form the full colour image.

This approach reduces noise in the images used in the colour correction, namely the low spatial frequency monochrome images. Therefore, the effect of noise in one or more of the channels has a correspondingly reduced effect on the colour correction process.

As with the first aspect of the invention, said colour correction in step II) may be applied only to a sub-set of low spatial frequency image pixels. Then, prior to step IV) said corrected low spatial frequency monochrome image is completed by interpolating and/or extrapolating from the sub-set of corrected smoothed image pixels to generate similarly corrected smoothed image pixels not in the original sub-set of corrected smoothed image pixels.

Also according to the second aspect of the invention, there is provided an image processing device for correcting the colour of a colour image, the device comprising a processor, software, and a memory, in which the memory stores image data representative of a plurality of image pixels, each image pixel having one of at least two colour values and each pixel having a luminance value representing the intensity of the colour value for that pixel in the image, wherein the processor, software and memory are operable to:

A) for each colour value, generate from the pixels for that colour value a low spatial frequency monochrome image composed of smoothed image pixels;

B) apply a colour correction function to the smoothed image pixels for one or more of colour values in order to generate one or more corresponding corrected smoothed images, said function including for the or each colour value a contribution from corresponding smoothed image pixels having one or more of the other colour values;

C) generate one or more high spatial frequency luminance images from the image; and D) combine the high spatial frequency luminance image(s) with the or each of the corrected low spatial frequency monochrome images to form the full colour image.

The following comments apply equally to both aspects of the invention.

Although a general colour correction scheme may involve the generation of one colour corrected smoothed image for each colour value, it may sometimes be the case that fewer or just one of the smoothed images has to be colour corrected.

In some applications, for example reconstruction of a full colour image from image mosaic data, it is preferable if the low frequency monochrome image, generated for each colour, extends across all pixel locations of the original colour image.

In the case of an image mosaic, the pixels of one colour value will not occupy all pixel locations in the original colour image. Therefore, in the generation of the original smoothed image, it may be convenient to interpolate between the original image pixels of at least one colour value to create additional image pixels of the same colour value in order to produce a corresponding interpolated image for said colour value. Such an interpolation can be implemented with relatively little computation, compared with the computation needed for the colour correction function.

In most image mosaic schemes, such as mosaics pixels arranged in the Bayer pattern, there is a predominance of pixels of one colour value as compared with the other colour values, each row and column containing image pixels of both the predominant colour and one of the other colours.

In a preferred embodiment of the invention, the smoothed image pixels consists of image pixels that lie in both alternate rows and alternate columns. Compared with colour correcting all smoothed image pixels, this reduces the colour correction computation by an amount that approaches 75% for large images. At the same time, each interpolated or extrapolated smoothed image pixel is adjacent one of the colour corrected smoothed image pixels.

The invention will now be described in further detail, by way of example with reference to the following drawings.

Figure 1:
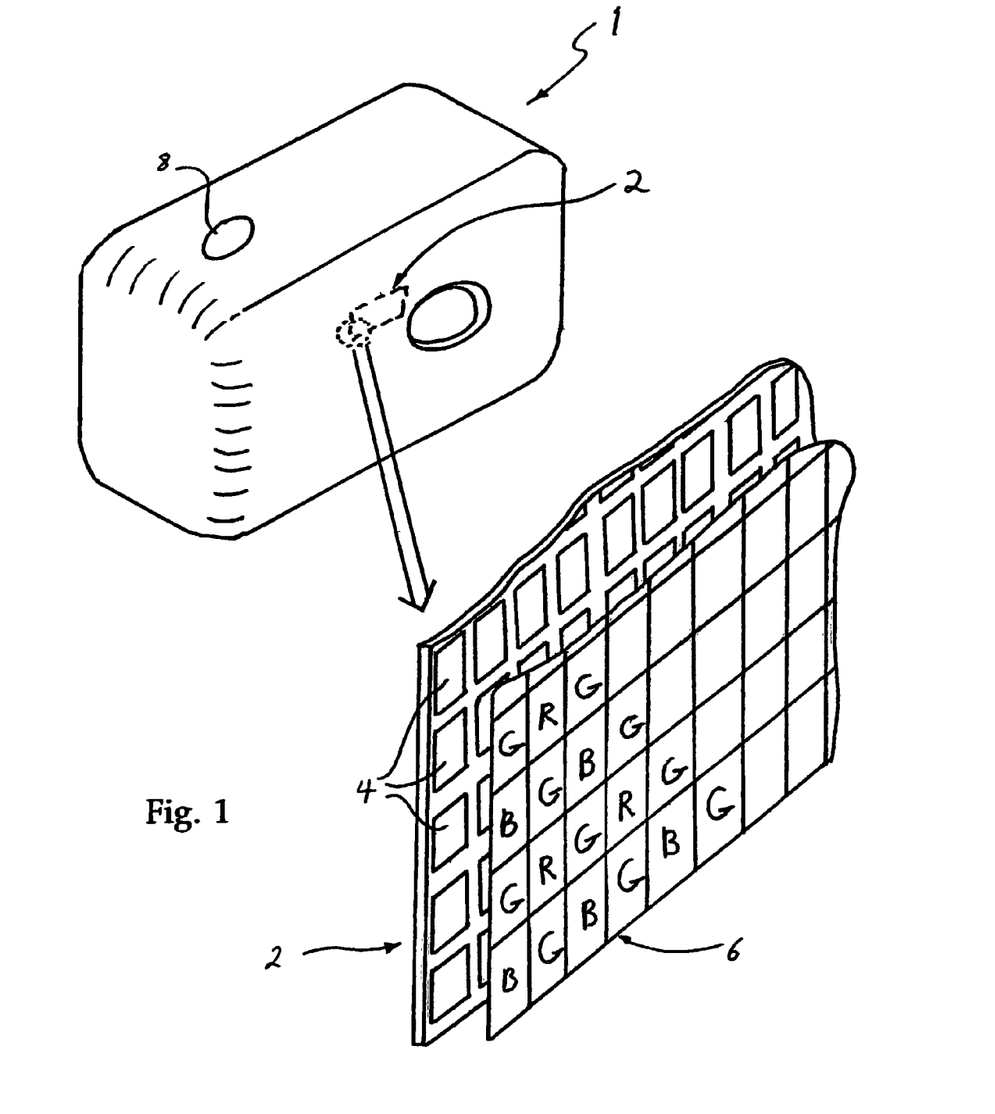
FIG. 1 shows schematically some of the internal components of a conventional electronic camera, including a colour sensor array having red, green and blue (RGB) imaging elements.

FIG. 1 shows one example of a consumer imaging device, here a hand-held digital camera 1. Such cameras have a colour image sensor 2 having a two-dimensional regular array of imaging elements or pixels 4. A typical consumer sensor array may have up to 4 Megapixels resolution, arranged in a rectangular array 2500 pixels wide and 1600 pixels high.

The imaging elements are sensitive to light across a wide spectrum of colours, and so the sensor array 2 is overlain by a mosaic-like pattern of colour filters 6. There are usually only three such colours, red (R), green (G) and blue (B), (RGB) and the colours are usually interleaved in a repeating pattern across the sensor array 2. Thus, the array elements 4 under each colour of filter 6 are sensitive only to light with wavelengths passed by each corresponding filter 6.

Many filter patterns exist, but the most common is the Bayer filter pattern. This consists of pixels with colour filters arranged in a rectangular grid pattern as set out below:

```
G R G R . . . G R G R
B G B G . . . B G B G
G R G R . . . G R G R
. . . . . . . . . . . .
B G B G . . . B G B G
G R G R . . . G R G R
B G B G . . . B G B G
``` where R, G and B represent red, green and blue colour filters respectively. For the Bayer pattern, there is a preponderance of green pixels in the sensor array, with these contributing half of the full sensor resolution, while the red and blue pixels each contribute one quarter of the resolution.

Figure 2:
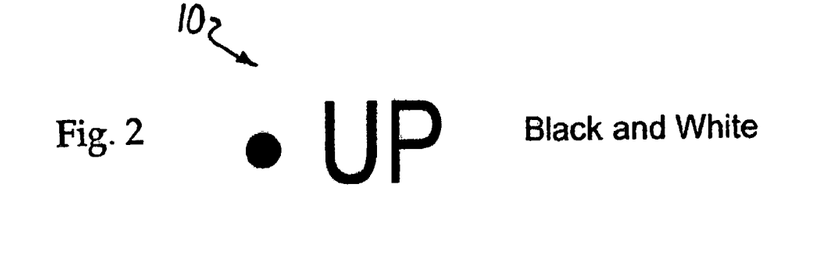
FIG. 2 shows an example of original black and white text to be imaged by a colour sensor array such as that in FIG. 1.
Figure 3:
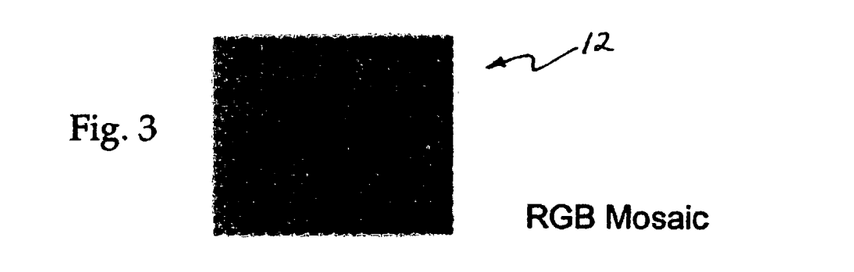
FIG. 3 shows the text when captured as an RGB mosaic image.

FIG. 2 shows an example of original black and white text 10, consisting of the symbols "• UP", to be imaged by the digital camera 1. The text 10 is part of a larger document (not shown) that is to be imaged in a desktop document imaging application. FIG. 3 shows how the text 10 is imaged as an RGB mosaic 12 within a small portion of the sensor array 2 consisting of 35 pixels in a horizontal direction and 29 pixels in a vertical direction.

Figure 4:
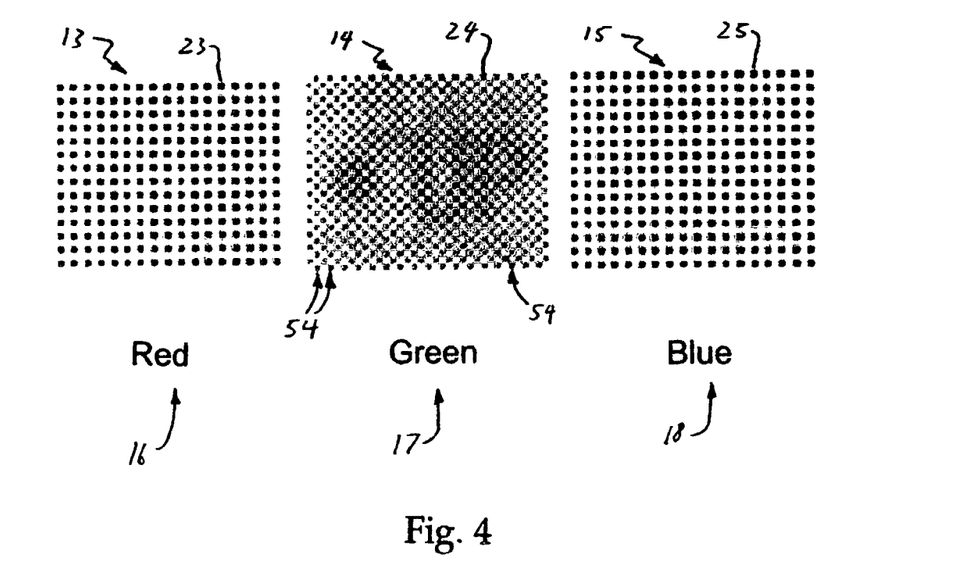
FIG. 4 shows the arrangement of red, green and blue pixels in the image mosaic of FIG. 3.

The Bayer pattern can be seen most clearly in FIG. 4, which shows for the three colour values red 16, green 17 and blue 19, that there are twice as many green pixels 14 as red pixels 13 or blue pixels 15. The original text 10 is visible as different luminance levels of the pixels 13,14,15.

Figure 5:
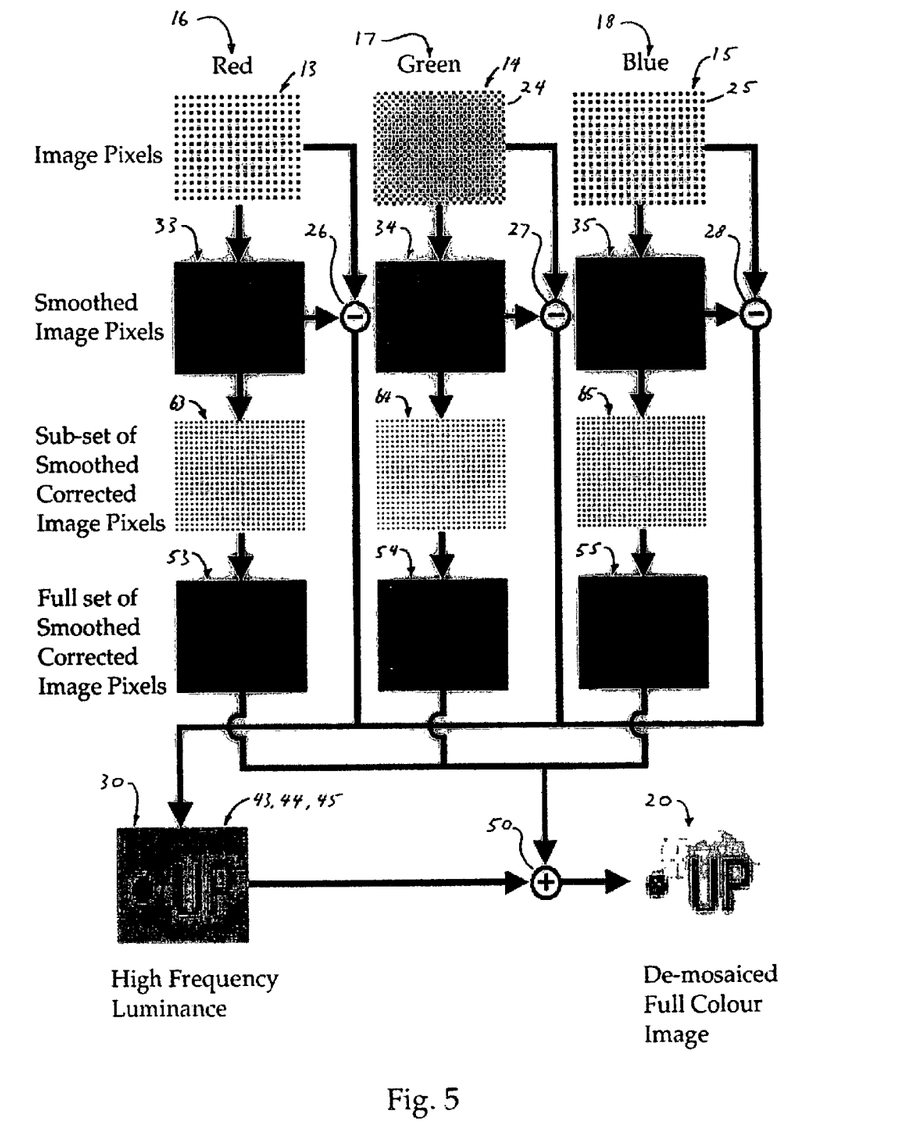
FIG. 5 shows schematically how the red, green and blue pixels are processed in a method according to the invention to yield colour corrected intermediate smoothed images, one for each colour value, and how these corrected images are then used to generate a de-mosaiced and colour corrected full colour image.

FIG. 5 shows schematically how the image mosaic 12 is processed to yield a colour corrected and de-mosaiced full colour image 20. First, for each colour value 16,17,18, a smoothed image 33,34,35 is formed. Then, for each of the three colour values 16,17,18, a difference is taken 26,27,28 between the luminance level of each individual pixel 13,14, 15 for that particular colour value 16,17,18, and a corresponding point of the smoothed image of the same colour value. This difference 26,27,28 is used to generate an achromatic high frequency image which when combined with similar differences for the other two colour values results in a composite achromatic high frequency image 30 that extends across all pixels locations in the original RGB image mosaic 12.

Therefore, the resulting composite image 30 is a black and white high frequency version of the original RGB image 12. Most conveniently, the high frequency image 30 consists of three sets of high frequency image pixels 43,44,45 at locations in the composite image 30 that correspond with the locations of corresponding sets of pixels 13,14,15 in the original RGB mosaic image 12. As can be seen in FIG. 5, these pixels 43,44,45 have different luminance values.

Each of the smoothed monochrome images 33,34,35 is formed by two-dimensional interpolation combined with low-pass filtering (examples of spatial filters including low pass or smoothing filters are given in Digital Image Processing, by Gonzalez and Woods, pages 189 to 201, Addison & Wesley, 1992). Here, the smoothed images 33,34,35 are formed individually for each of the three colour values 16,17,18 using bilinear interpolation as a pre-processing step. All three smoothed images 33,34,35 then extend across locations corresponding with all elements of the RGB mosaic pattern 12.

One or more of the three sets of low spatial frequency image pixels 33,34,35 for the colour values 16,17,18 are then processed as follows in order to generate up to three corresponding colour corrected low spatial frequency image pixels 53,54,55. FIG. 5 shows the general case where all three sets of original smoothed image pixels 33,34,35 are processed to make a colour correction. The colour correction need not change the actual colour of the smoothed images, but will usually be a correction to intensity values in up to three of the sets of smoothed pixels.

For example, as described in the introduction, an improved green signal at a point in an image may be derived from a weighted combination of the red (R), green (G) and blue (B) signals at that point.

$$C_g(G) = aR + bG + cB,$$

where $C_g(m)$ gives the corrected value for a green pixel of value m.

To correct all of the colours at the point of the image, a 3×3 matrix multiplication can be used:

$$C([R\ G\ B]) = [R\ G\ B] \begin{bmatrix} a & d & g \\ b & e & h \\ c & f & i \end{bmatrix},$$

where C(n) gives the corrected values for the RGB triplet n.

Although a colour correction may be needed for all three colour values 16,17,18, for simplicity, the details of just one colour correction for the green colour value 17 are described below. In order to reduce the computational requirement, the invention proposes performing the colour correction only on a sub-set 63,64,65 of the complete set of smoothed image pixels 33,34,35.

Consider now a 3×3 block of uncorrected low spatial frequency smoothed green image pixels, denoted by the values G1 to G9:

$$\begin{matrix} G1 & G2 & G3 \\ G4 & G5 & G6 \\ G7 & G8 & G9 \end{matrix}$$

The corresponding colour corrected low spatial frequency green values g1 to g9 can be represented by:

$$\begin{matrix} g1 & g2 & g3 \\ g4 & g5 & g6 \\ g7 & g8 & g9 \end{matrix}$$

A sub-set is of the smoothed image pixels G1–9 is selected, consisting of the corner values G1, G3, G7 and G9. The colour correction calculation is performed only for these four image pixels, with the other image pixels being interpolated, as follows:

$$\begin{matrix} g1 & g2 & g3 \\ g4 & g5 & g6 \\ g7 & g8 & g9 \end{matrix} = \begin{matrix} C_g(G1) & (g1+g3)/2 & C_g(G3) \\ (g1+g7)/2 & (g1+g3+g7+g9)/4 & (g3+g9)/2 \\ C_g(G7) & (g7+g9)/2 & C_g(G9) \end{matrix}$$

There are, of course, many other possible sub-sets which may be selected, and many other interpolation or extrapolation schemes for calculating corrected image pixels not in the selected sub-set. This example, however, in which the selected smoothed image pixels come from both alternate rows and alternate columns, gives excellent results with a significant savings in the required computation.

Methods such as the one described herein require far less computation than traditional colour correction methods. For example, the described method requires approximately one-quarter of the computation with little or no detectable loss in image quality.

Furthermore, because the colour correction is performed on low spatial frequency pixels in which noise in any of the colour channels is smoothed out, the colour correction does not mix noise between colour planes or increase the amount of noise in the colour corrected image.

After colour correction, the image can be demosaiced as follows. For each high frequency pixel 43,44,45, the achromatic high frequency luminance value is added 50 to a corresponding portion of each of the three colour corrected smoothed images 53,54,55, which results in a de-mosaiced full colour image 20. In the case that one or two of the colour values 16,17,18 do not require colour correction, then at this stage in the computation for that uncorrected colour value, the original uncorrected smoothed set of image pixels 33,34, 35 is combined with the corresponding high frequency pixels 43,44,45.

This method has the advantage of being relatively easy to compute in electronic hardware, while still giving good reconstructed image quality for colour corrected images.

Rather than interpolating the individual colour planes to full resolution, prior to smoothing, only to then sample the smoothed versions for colour correction it is possible to reduce the computation required still further by reducing the number of mosaic pixel locations at which the mosaic pattern is spatially filtered to produce the low spatial resolution images. This results in smoothed images with lower spatial frequencies than might otherwise be the case (unless the degree of smoothing is itself reduced to accommodate the change in spatial resolution), but at no great ultimate loss in information content, for the reason that image details are reintroduced by adding the high frequencies as described above. Preferably, smoothed images are computed only for a subset of the green pixels 14, for example as shown in FIG. 4 those green pixels in columns 54 (or alternatively rows) having both green pixels 14 and red pixels 13. For the Bayer pattern, this requires one quarter of the computation, required for smoothing, while the image quality remains almost constant.

For red and blue pixels, 13 and 15 respectively, this amounts to avoiding the initial interpolation stage and operating the smoothing on images formed from the raw red and blue pixels alone.

Therefore, each of the high spatial frequency images 44,45,46 is formed for each of the colour values 16,17,18 from the difference 26,27,28 between the luminance values of the image mosaic pixels 16,17,18 for that colour value and corresponding portions of the smoothed monochrome image 33,34,35 for that same colour value 16,17,18.

In other words, the high frequency component of each mosaic pixel is given by subtracting the mosaic value from the corresponding location of a smoothed version of the image for the same colour value.

The colour corrected and de-mosaiced full colour image 20 is then formed for each of the colour values 16,17,18 by summing each of the high spatial frequency images 30 with corresponding portions of the colour corrected smoothed monochrome images 53,54,55 for that colour value.

Figure 6:
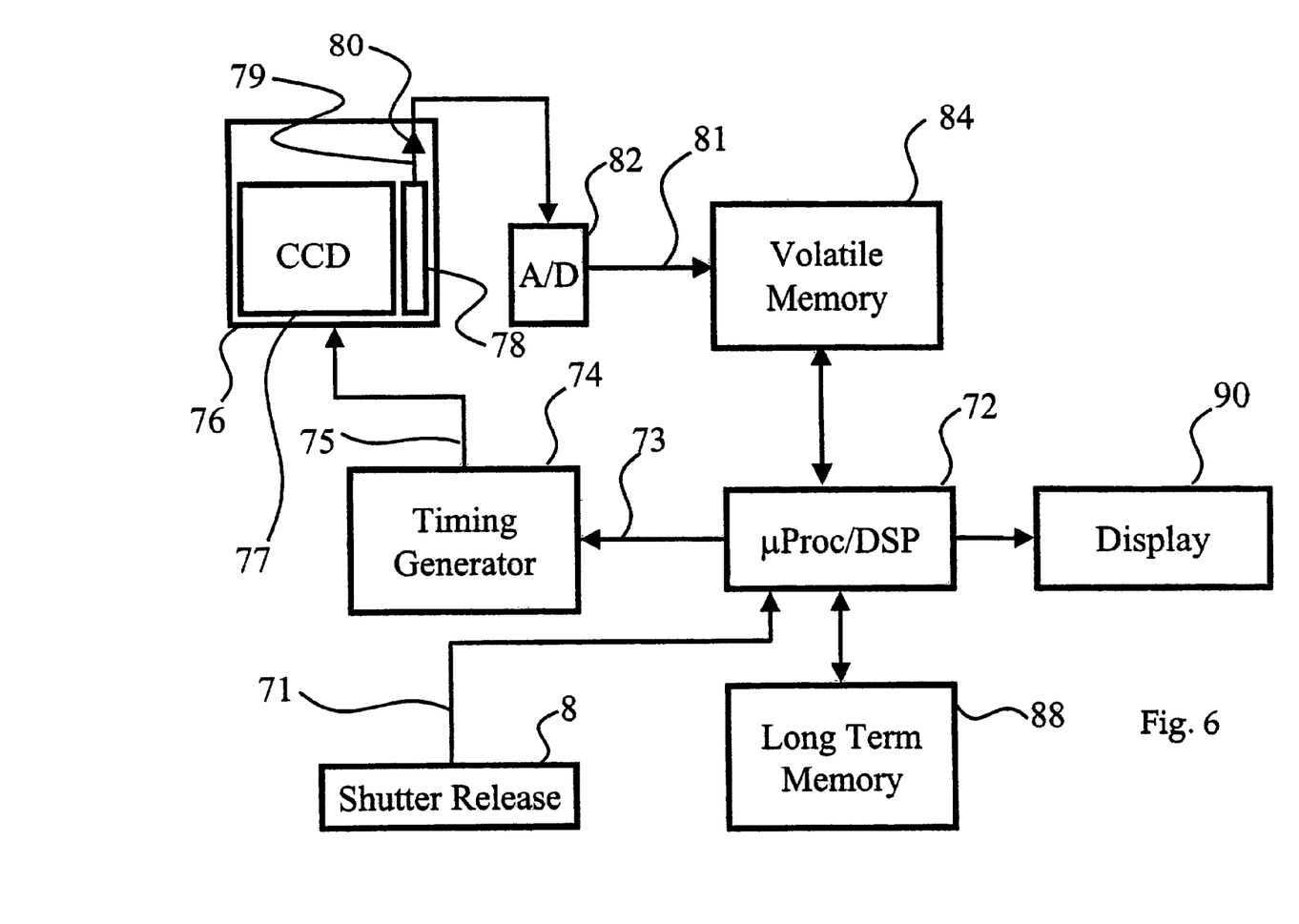
FIG. 6 is a circuit schematic diagram for a device according to the invention for de-mosaicing an image mosaic to form a full colour image, the device comprising a processor, software, and a memory.
Figure 7:
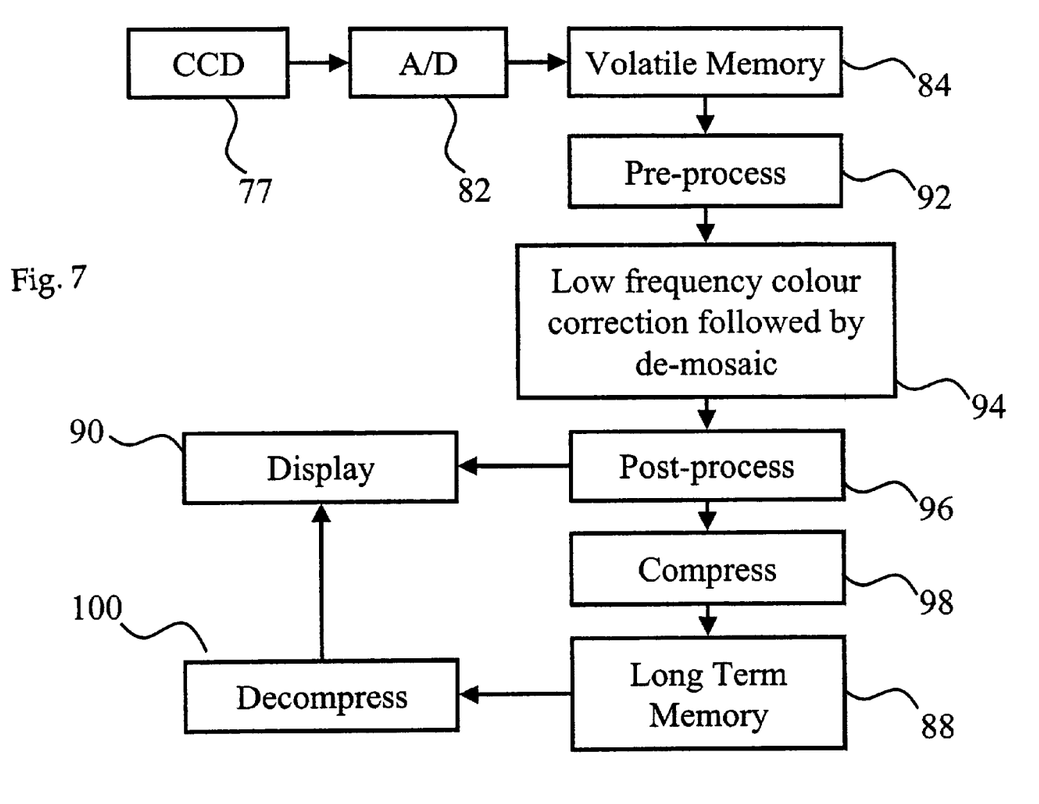
FIG. 7 is a flow chart illustrating a preferred embodiment of the method according to the invention for de-mosaicing an image mosaic to yield a full colour image.

The process described above may be readily implemented in hardware, illustrated in block schematic form in FIG. 6, and illustrated in the flowchart of FIG. 7.

A shutter release mechanism 8 when activated by a user sends a signal 71 to a microprocessor unit 72, which may include a digital signal processor (DSP). The microprocessor then sends an initiation signal 73 to a timing generator 74, whereupon the timing generator sends a trigger signal 75 to an electronic image sensor unit 76.

The sensor 76 consists of an imaging area 77 consisting of an array of sensing elements (typically either of a photogate or alternatively photodiode construction) and a serial readout register 78 from where an analogue signal 79 is generated via an amplifier 80. This signal 79 is generated upon receipt by the sensor unit 76 of the trigger signal 75.

The amplified analogue signal 79 is converted to a digital signal 81 by an A/D unit 82. The resulting raw digital image data is stored temporarily in a volatile memory 84.

Image processing according to the present invention can then be performed by the microprocessor unit 72. The microprocessor may include additional DSP capability in the form of specialised block of hardware to carry out specific functions or an additional more general DSP co-processor.

The processing itself may be performed according to the steps outlined in the flow-chart of FIG. 7. These include a pre-processing stage 92, which may typically include correction of the OECF (opto-electronic conversion function) of the sensor and white-balancing to compensate for variations in illumination. Following the colour correction and de-mosaicing stage 94 described above, a subsequent post-processing stage 96 may include exposure correction (which can also be accomplished at the pre-processing stage) and transformation to a standard colour space such as sRGB (as described in IEC 61966-2-1). Finally the reconstructed RGB image data can be-compressed 98 and stored in long term memory 88 using a standard image compression scheme such as the ubiquitous JPEG scheme.

Additionally a display device 90 may be incorporated into the design. Images can be displayed live to facilitate viewfinding or reviewed from long term memory requiring an additional decompress processing stage 100.

Although a preferred embodiment of the invention has been described with reference to the Bayer pattern of image pixels, the invention is applicable to cases where not all rows and/or columns contain image pixels of at least two colours. For example, some mosaics have pure green rows and columns interleaved with red/blue rows or columns. The invention is equally applicable to such image mosaics.

It is not strictly necessary to store the whole raw image frame in volatile memory. The image processing can be performed on the fly, thus requiring only as much memory as is necessary to perform the imaging pipeline. So after the first few rows of image data have been read from the sensor into memory it is possible to generate compressed image data for the start of the image and begin storing these in long term memory. This results from the fact that all processes are essentially local and operate only on a limited area of the image.

In other words, although the "images" constructed at each stage of the process could be complete sets of data that extend across the entire image, in practice this adds cost in terms of memory and possible throughput. Therefore, the "images" used at each stage of the process will in general be created piecemeal, with the process operating locally. In the limit all the computation may be carried out for a single pixel from the pixels in its neighbourhood.

The invention described above maintains image detail from all of the sensor elements while reconstructing a full RGB image. It can be incorporated into any scheme that is based upon the combination of an achromatic high frequency image with low frequency red, green and blue images (or other primary colour combinations). Preferably it is incorporated into an additive reconstruction scheme whereby the achromatic high frequencies are added to each of the low frequency colour channels.

The method described above for colour correcting and reconstructing a full colour image from image mosaic data is computationally attractive and utilises all three colour values of the mosaic to produce high resolution colour images. The method also significantly reduces the effect of noise in the original colour channels on the colour correction process.

In the colour correction computation, a good compromise between speed and quality is achieved when the colour correction is computed for alternate pixel rows and columns of the low frequency image, with the results being interpolated to the other nearby pixels.

Although particularly useful in the context of demosaicing the image data from a colour mosaic sensor, this invention can be applied in other contexts where a colour correction or colour space conversion is required, even if the image to be corrected already has red, green and blue values for each pixel. For example, an image to be mapped into a different colour space for printing could be converted into three low frequency colour separations plus one or more high frequency components. The low frequency separations could be colour corrected, possibly at a reduced spatial resolution with subsequent interpolation back to the original resolution, prior to recombination with the high frequency component(s). Thus the conversion could be performed with reduced computation and with potential improvements in image quality.

Furthermore, although in the above example, the image data is of an image mosaic, the invention can be applied to cases where each location in the original colour image has overlapping or coincident pixels of multiple colour values. Such images can be generated by imaging systems having three CCD sensors, by flatbed colour scanners, or other imaging systems in which the colour image is formed from sets of separate, registered RGB images.

The invention therefore provides an efficient method with reduced sensitivity to image noise for colour correcting and reconstructing a high quality image, with the full sensor resolution in each of the red, green and blue colour channels.

The invention claimed is:

1. An image processing method of correcting the colour of a colour image, the colour image including at least two sets of image pixels, each set having a distinct colour value, and each pixel having a luminance value representing the intensity of the colour value for that pixel in the colour image, the method comprising the steps of:
   i) for each colour value, generating from the pixels for that colour value a low spatial frequency monochrome image including a set of smoothed image pixels;
   ii) for at least one colour value, selecting a sub-set of the smoothed image pixels;
   iii) generating one or more corresponding sub-sets of corrected smoothed image pixels by applying a colour correction function to the or each sub-set of smoothed image pixels, said function including for each colour value a contribution from corresponding smoothed image pixels in one or more of the other sets of smoothed image pixels;
   iv) completing one or more sets of corrected smoothed image pixels by at least one of interpolating and extrapolating from the or each of the corrected smoothed image pixels to generate similarly corrected smoothed image pixels not in the original sub-set of smoothed image pixels; and
   v) generating a corrected colour image by using the or each set of corrected smoothed image pixels.

2. A method as claimed in claim 1, in which step v) comprises the steps of generating from the original image pixels a high spatial frequency luminance image; and combining the high spatial frequency luminance images with said set(s) of corrected or uncorrected smoothed image pixels to form the corrected full colour image.

3. A method as claimed in claim 2, in which the colour image is an image mosaic, and for each colour value, generating a high spatial frequency luminance image that extends only across pixels locations of the image mosaic for that colour value, and combining each of said high spatial frequency luminance images with each of the corresponding set(s) of corrected smoothed image pixels, or when there is no such corrected set, the corresponding set(s) of smoothed image pixels.

4. An image processing method of correcting the colour of a colour image, the image including a plurality of image pixels and each image pixel having one or at least two colour values and having a luminance value representing the intensity of the colour value for that pixel in the image, the method comprising the steps of:
   I) for each colour value, generating from the pixels for that colour value a low spatial frequency monochrome image including smoothed image pixels;

II) generating one or more corresponding corrected smoothed images by applying a colour correction function to the smoothed image pixels for one or more of the colour values, said function including for the or each colour value a contribution from corresponding smoothed image pixels having one or more of the other colour values;

III) generating one or more high spatial frequency luminance images from the image; and IV) combining the high spatial frequency luminance image(s) with the or each of the corrected low spatial frequency monochrome images to form the full colour image.

5. An image processing method as claimed in claim 4 in which:

V) in step II) said colour correction is applied only to a sub-set of low spatial frequency image pixels; and VI) prior to step IV) said corrected low spatial frequency monochrome image is completed by interpolating and/or extrapolating from the sub-set of corrected smoothed image pixels to generate similarly corrected smoothed image pixels not in the original sub-set of corrected smoothed image pixels.

6. An image processing method as claimed in claim 1, in which the colour image is an image mosaic, the pixels of each colour value being interleaved in rows and columns across the image mosaic with pixels of different colour values to form the image mosaic in such a way that one or more of at least one of the rows and columns include image pixels of at least two colours.

7. An image processing method as claimed in claim 6, in which there is a predominance of pixels of one colour value as compared with the other colour values, each row and column including image pixels of both the predominant colour and one of the other colours.

8. An image processing method as claimed in claim 7, in which said smoothed image pixels consist of image pixels that lie in both alternate rows and alternate columns.

9. An image processing method as claimed in claim 4, in which the colour image is an image mosaic, the pixels of each colour value being interleaved in rows and columns across the image mosaic with pixels of different colour values to form the image mosaic in such a way that a plurality of at least one of the rows and columns includes image pixels of at least two colours.

10. An image processing method as claimed in claim 9, in which there is a predominance of pixels of one colour value as compared with the other colour values, each row and column including image pixels of both the predominant colour and one of the other colours.

11. An image processing method as claimed in claim 10, in which said smoothed image pixels include image pixels that lie in both alternate rows and alternate columns.

12. A method as claimed in claim 1, in which the low frequency monochrome image extends across all pixel locations of the original colour image.

13. A method as claimed in claim 4, in which the low frequency monochrome image extends across all pixel locations of the original colour image.

14. An image processing method as claimed in claim 1, in which the colour values comprise red, green and blue, there being a preponderance of green pixels in the image mosaic.

15. An image processing method as claimed in claim 4, in which the colour values comprise red, green and blue, there being a preponderance of green pixels in the image mosaic.

16. An image processing device for correcting the colour of a colour image, the device comprising a processor, software, and a memory, in which the memory is arranged to store image data representative of a colour image having at least two sets of image pixels, each set having a distinct colour value, and each pixel having a luminance value representing the intensity of the colour value for that pixel in the colour image, wherein the processor, software and memory are operable to:

a) for each colour value, generate from the pixels for that colour value a low spatial frequency monochrome image consisting of a set of smoothed image pixels;

b) for at least one colour value, select a sub-set of the smoothed image pixels;

c) apply a colour correction function to the or each subset of smoothed image pixels in order to generate one or more corresponding sub-sets of corrected smoothed image pixels, said function including for each colour value a contribution from corresponding smoothed image pixels in one or more of the other sets of smoothed image pixels;

d) complete one or more sets of corrected smoothed image pixels by at least one of interpolating and extrapolating from the or each of the corrected smoothed image pixels to generate similarly corrected smoothed image pixels not in the original sub-set of smoothed image pixels; and e) use the or each set of corrected smoothed image pixels to generate a corrected colour image.

17. An image processing device for correcting the colour of a colour image, the device comprising a processor, software, and a memory, in which the memory is arranged to store image data representative of a plurality of image pixels, each image pixel having one of at least two colour values and each pixel having a luminance value representing the intensity of the colour value for that pixel in the image, wherein the processor, software and memory are operable to:

A) for each colour value, generate from the pixels for that colour value a low spatial frequency monochrome image consisting of smoothed image pixels;

B) apply a colour correction function to the smoothed image pixels for one or more of colour values in order to generate one or more corresponding corrected smoothed images, said function including for the or each colour value a contribution from corresponding smoothed image pixels having one or more of the other colour values;

C) generate one or more high spatial frequency luminance images from the image; and D) combine the high spatial frequency luminance image(s) with the or each of the corrected low spatial frequency monochrome images to form the full colour image.

18. The method as claimed in claim 1, wherein the sub-set selecting step for the at least one colour value is for only that colour value and the completing step is for said at least one colour value and the corrected smoothed image pixels are for that colour value.

19. The method as claimed in claim 4, wherein the function for each particular colour value results from the contribution having only the particular contribution.

20. The device as claimed in claim 16, wherein the selected sub-set for a particular at least one colour value is of only the particular colour value and function for each particular colour value results from the contribution having only the particular contribution.

21. An image processing method of correcting the colour of a colour image, the image including a plurality of image pixels, each image pixel having at least one of at least two colour values and having at least one value representing the respective intensity of each colour value for that pixel in the image, the method comprising the steps of:
  I) for each colour value, generating from the pixels for that colour value a noise-reduced image including filtered image pixels;
  II) generating one or more corresponding corrected filtered images by applying a colour correction function to the filtered image pixels for one or more of the colour values, the function including, for each colour value, a contribution from corresponding filtered image pixels having one or more of the other colour values;
  III) generating one or more high speed spatial frequency luminance images from the images; and
  IV) forming a corrected colour image by combining the one or more high spatial frequency luminance images with the one or more corrected filtered images.

22. An image processing method as claimed in claim 1, wherein the one or more corrected filtered images are formed by applying a two-dimensional smoothing function of all pixel locations.

23. An image processing method as claimed in claim 21, wherein the noise-reduced image is formed by applying a two-dimensional smoothing function at all pixel locations.

24. Apparatus for correcting the colour of a colour image, the image including a plurality of image pixels, each image pixel having at least one of at least two colour values and having at least one value representing the respective intensity of each colour value for that pixel in the image, the apparatus including a processor for performing the steps of claim 21.

25. The apparatus as claimed in claim 24, wherein the processor is arranged to form the noise-reduced image by applying a two-dimensional smoothing function at all pixel locations.

* * * * *